Jan. 6, 1970     A. SHANOK ET AL     3,487,504
EXTRUSION DEVICE
Filed April 11, 1966     2 Sheets-Sheet 1
FIG. 1
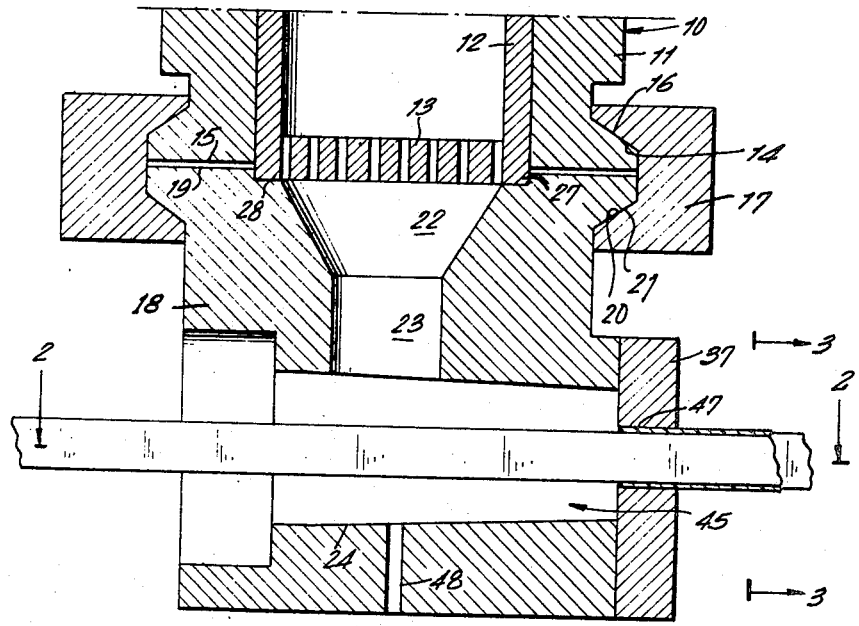
FIG. 2
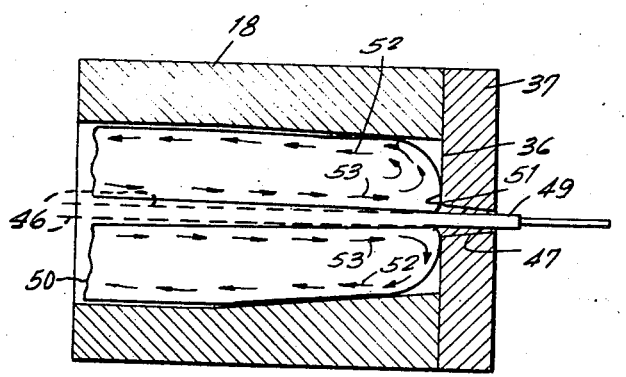
FIG. 3
INVENTORS
ABRAHAM SHANOK
VICTOR SHANOK
BY JESSE P. SHANOK
Friedman & Goodman
ATTORNEYS Jan. 6, 1970   A. SHANOK ET AL   3,487,504
EXTRUSION DEVICE Filed April 11, 1966   2 Sheets-Sheet 2

INVENTORS
ABRAHAM SHANOK
VICTOR SHANOK
BY JESSE P. SHANOK

ATTORNEYS

United States Patent Office 3,487,504
Patented Jan. 6, 1970

3,487,504
EXTRUSION DEVICE
Abraham Shanok and Victor Shanok, executor of the estate of Abraham Shanok, deceased, and Jesse P. Shanok, Brooklyn, N.Y., assignors to Glass Laboratories Company, a limited partnership of New York
Continuation-in-part of application Ser. No. 243,172, Oct. 26, 1962. This application Apr. 11, 1966, Ser. No. 541,545
Int. Cl. B29f 3/10
U.S. Cl. 18—13                                   5 Claims This is a continuation-in-art of our application Serial No. 243,172, filed Oct. 26, 1962, (now patent No. 3,245,864) which is a division of application No. 498,608, filed Apr. 1, 1955, now abandoned, and a continuation-in-part of application Ser. No. 413,524, filed Mar. 2, 1954, now Patent No. 2,774,811.

This invention relates to an extruding machine or apparatus for coating or encapsulating flexible strips, tapes, webs, etc. with a suitable plastic material.

Extruding machines or apparatus for encapsulating relatively thin flexible strips, tapes, webs, etc. with plastic material are known in the art. In one such type of machine, the extruder is provided with a transverse bore having means for feeding liquified plastic to the bore. The bore extends in a direction transversely to the direction in which the liquified plastic material flows through the inlet to the bore. The bore terminates at one end thereof in a die aperture or orifice. The apparatus is provided with a suitable take-up device by means of which a flexible strip is pulled through the extruding apparatus. In its travel through the transverse bore provided in the extruding apparatus, the flexible strip is supported by a hollow tube which is disposed in the core and which terminates in close proximity to the die aperture.

Each time that the extrusion apparatus is set up or prepared to provide a different type of encapsulated, flexible strip, the extrusion apparatus, and especially the transverse bore provided therein, must be cleaned. This necessitates the removal from the bore of the hollow tube which is used to support the flexible strip in its travel throuhg the extrusion apparatus and, as a result, production delays are encountered.

In view of the foregoing, it is the primary object of the present invention to provide an extrusion apparatus of the described type which would be simple and easy to clean without encountering undue production delays.

Other and further objects and advantages of the present invention will be readily apparent to one skilled in the art from a consideration of the following specification taken in connection with the appended drawings.

In the drawings which illustrate the best mode presently contemplated for carrying out the invention.

FIGURE 1 is a longitudinal sectional view taken through the extrusion device showing the flexible strip in relation to the cylinder and cross-head;

FIGURE 3 is a sectional view of the cross-head taken along line 2—2 of FIGURE 1;

FIGURE 3 is a transverse section through plane 3—3 of FIGURE 1 showing a cross-section of the finished plastic coated strip;

Figure 4:
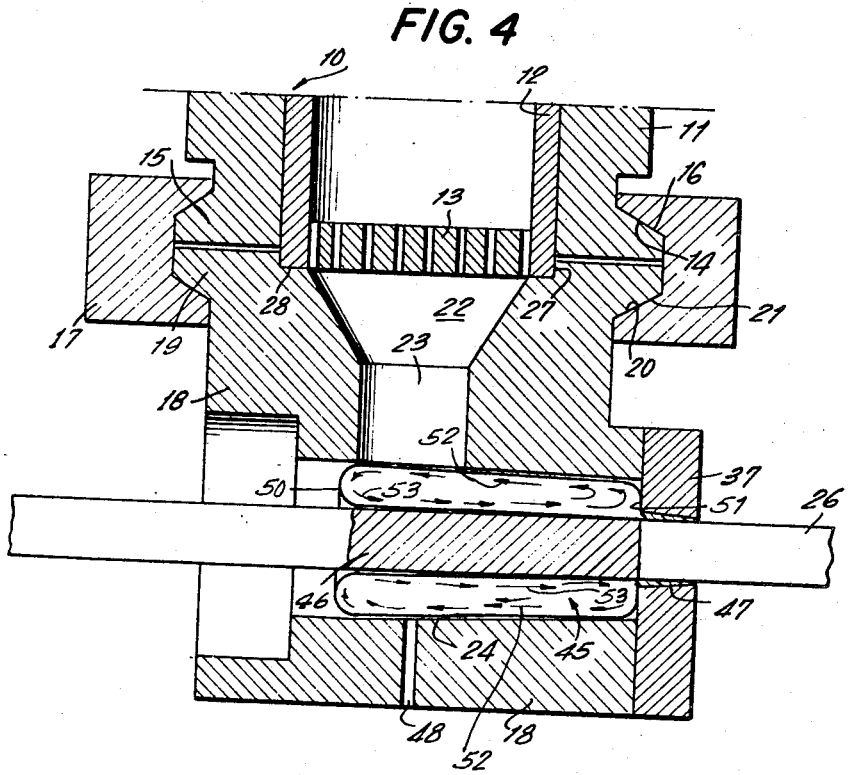
FIGURE 4 is a longitudinal section similar to FIGURE 1 and illustrates the formation of a doughnut-shape vortex ring of plastic material within the extrustion apparatus, as is also illustrated in FIGURE 2.

Referring to the drawings in detail, FIGURE 1 illustrates a novel extruder 10 pursuant to the present invention. The extruder 10 pursuant to the present invention. The extruder 10 comprises a cylinder 11, in which there is mounted a liner 12 which includes a breaker plate 13. Liquified plastic material is forced by conventional screw means (not shown) under pressure through the liner 12. Since the plastic fluid material must then flow through the restricted passages presented by the breaker plate 13, air bubbles and other extraneous materials, which may possibly be contained in the stream are substantially eliminated and the material is outherwise fed in suitable form to the extrusion head.

A peripheral, bevelled shoulder 14 is provided adjacent the inner head end 15 of the cylinder 11 to coact with a similarly shaped surface 16 of a clamp ring 17 for securing purposes. A crosshead 18 having an inlet end 19 adjoins the cylinder head end 15 and also includes an inclined peripheral shoulder 20 which coacts with a corresponding surface 21 of the clamp ring 17. Thus, the head of cylinder 11 and the crosshead 18 are secured together with the clamp ring 17, whose oppositely inclined surfaces 16 and 21 bear against the contiguous inclined surfaces of the shoulders 14 and 20 respectively.

The crosshead 18 is formed with a central bore 22, which is axially aligned with the cylinder 11. The upstream end of the bore 22 is tapered from a larger upstream dimension adjoining the breaker plate 13 to a uniform passageway 23 of smaller dimension. Passageway 23 intersects a longitudinal or transverse bore 24.

Figure 5:
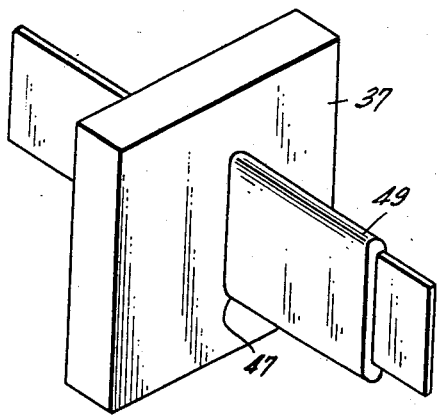
FIGURE 5 is a perspective view, on an enlarged scale, of the coated, flexible strip passing through the die.
Figure 6:
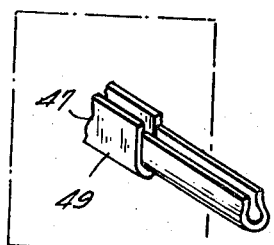
FIGURE 6 is a perspective view of a coated strip of different shape passing through a corresponding die modification.

Adjacent to the outer surface of the end 19, there is provided a bore 27 large enough to snugly receive the liner 12. An annular shoulder 28, which intersects the bore 27 transversely, forms a supporting surface for the inner end surface of the breaker plate 13. When the clamp ring 17 forces the cylinder 11 towards the crosshead 18, the breaker plate 13 sealingly contacts the crosshead along the shoulder 28. Provision is made for a die 37 which comprises a block having a central tapered extrusion hole 47 of any desired cross-section and provides an outlet end closure for the bore 24. The extrusion hole 47 is horizontally disposed and shaped similarly to the strip 26 and is slightly larger in cross-section providing clearance space for the passage of the extruded plastic. In FIGURES 5 and 6, die holes of varying shapes are depicted. These showings should not be interpreted as restricting the inventive scope, since the particular shape desired is not material to the invention.

Coaxial with bore 22 is a vent hole 48 communicating with the bore 24, whereby excess pressure due to the plastic stream is relieved to the atmosphere. However, the air vent can be dispensed with, if the crosshead is open to one side, as is the case in the described embodiment.

It has been observed that because chamber 45 defines an enlarged space below the feed bore or passageway 23 as compared to the space adjacent the die 37 there is a tendency to slow down or buffer the flow speed of the fluid material in the passageway 45 to match it to the speed with which the plastic fluid material is being supplied from the passageway 23. As a result, there is a substantially free flowing stream of plastic which is picked up by the flexible strip as it moves through the bore 24 defining the chamber 45 and out through the discharge bore 47 in the die 37. It will be understood that suitable conventional means, not shown, may be utilized to cause the flexible strip to be moved through the crosshead.

Pursuant to the basic, inventive concept of the present invention, the bore 47 in the die 37 is provided with a scraper edge 51 at the entrance to the bore 47 which is disposed at the outlet end of the chamber 45. As the coated strip 26 moves through the die bore or orifice 47, excess fluid plastic material 46 is scraped off the coated strip by the scraper edge 51. As a result a portion of the material indicated generally by the cross-hatch 46a as shown in FIGURE 4, begins to flow backwardly against the direction of movement of the flexible strip 26, as indicated by the arrows 52 in FIGURES 2 and 4. The reflex stream is then again reversed by the movement of the material resulting from the movement of the strip 26, the material now moving in the direction of the arrows 53. As a result, there is defined a reflex flow ring 50 about the strip 26 which assures that the plastic is uniformly deposited upon the strip as it is drawn through the chamber 45.

In operation, as indicated, the flexible strip 26 is drawn from the die 37 by a conventional take-up reel means, not illustrated, and leaves the die through bore 47 therein. The flexible strip 26 has a conformation which is complementary to that of the die bore 47. During the period that the strip 26 is pulled through the crosshead 18, liquified plastic material is fed under pressure by conventional means (not shown) into the liner 12. After passing through the apertured diaphragm 13, the plastic material flows substantially without pressure into the crosshead.

After the crosshead is partially filled with the liquified plastic material, a uniform coating of plastic is applied to the strip 26. Since the supply of liquified plastic material is uniformly distributed about the moving strip, all differentials in pressure applied to the strip are eliminated with the result that the strip 26 is not subjected to pressure deflections which could otherwise bend or deform the strip. The elimination of such pressures combined with the fact that the doughnut-shaped reflex ring 50, created from the excess plastic material which is stripped off at the scraping edge 51, tends to provide support to the flexible strip immediately prior to its passageway through the die orifice. As a result, the strip is prevented from being bent, folded or otherwise deformed from its normal configuration. The plastic coating or sheathing 49 acquires its final shape as shown in FIGURES 5 and 6, when it passes through the opening or bore 47 in the die 37, the material solidifying as it passes outwardly from the die plate.

The described extrusion apparatus permits for the encapsulation or sheathing of core strips made of various different materials for example, metallic foils, textile material, paper material and the likes. If such materials are coated pursuant to prior art extrusion mechanisms, such materials are frequently subjected to buckling, breakage, bending, or other structural abnormalties. Metallic foils of .05 millimeter thickness can easily be encapsulated or sheathed by the apparatus of the present invention. For example, aluminum foil having a thickness of approximately .05 millimeters can be readily encapsulated in acetyl cellulose or acetyl cellulose butyrate in its clear form thus obtaining a strong continuous strip having the appearance of chrome plating. The coating or sheathing forms a strongly cohesive and firmly bonded jacket or coating over the metallic foil and makes it structurally strong and corrosion proof. Pursuant to the apparatus of the present invention, it is possible to produce a wide range of shaped strips for numerous different applications, for example, masking strips, decorative strips for ornamental, as well as structural purposes. In addition, electrical conductors comprising a thin band of material embedded in insulation can also be formed according to the present invention. Such conductors can comprise a plurality of parallel wires spaced from each other and embedded in a single length of insulating thus producing a multiple conductor.

We claim:
1. An extrusion device adapted to encapsulate a flexible strip of thin strip material within an envelope of synthetic resin consisting essentially of a crosshead having an inlet for the reception of fluid plastic, an enlarged passageway transversely communicating with the inlet, and a horizontally disposed extrusion die hole communicating with one end of the passageway, in combination with means for guiding a thin strip of material through a portion of the passageway, and means for forming a reflex flow ring in the fluid plastic to support the strip material as it enters the extrusion die hole and buffer the flow speed fluid material in the crosshead.

2. An extrusion device as in claim 1, the end of said internal passageway remote from said extrusion die hole being open.

3. An extrusion device as in claim 1, said reflex flow forming means forming a doughnut-shaped fluid ring.

4. An extrusion device as in claim 3, said doughnut-shaped reflex ring forming means comprising a scraping edge provided at the line of communication between said enlarged passageway and said extrusion die hole to scrape excess plastic fluid material from the strip and allow it to flow backwardly against the direction of movement of said strip until it is again picked up by the strip.

5. An extrusion device as in claim 4, said scraping edge encompassing said die hole at the side of the latter through which the strip enters the die hole and being disposed in the end of the enlarged passageway which communicates with the extrusion die hole.

No references cited.

ROBERT F. WHITE, Primary Examiner

JEFFERY R. THURLOW, Assistant Examiner

U.S. Cl. X.R.
264—174